Nov. 29, 1927.

E. R. JACOBI ET AL 1,650,794

WHEEL

Filed June 1, 1926

INVENTORS
Emil R. Jacobi
BY Frank H. LeJeune

Stuart C Barns
ATTORNEY.

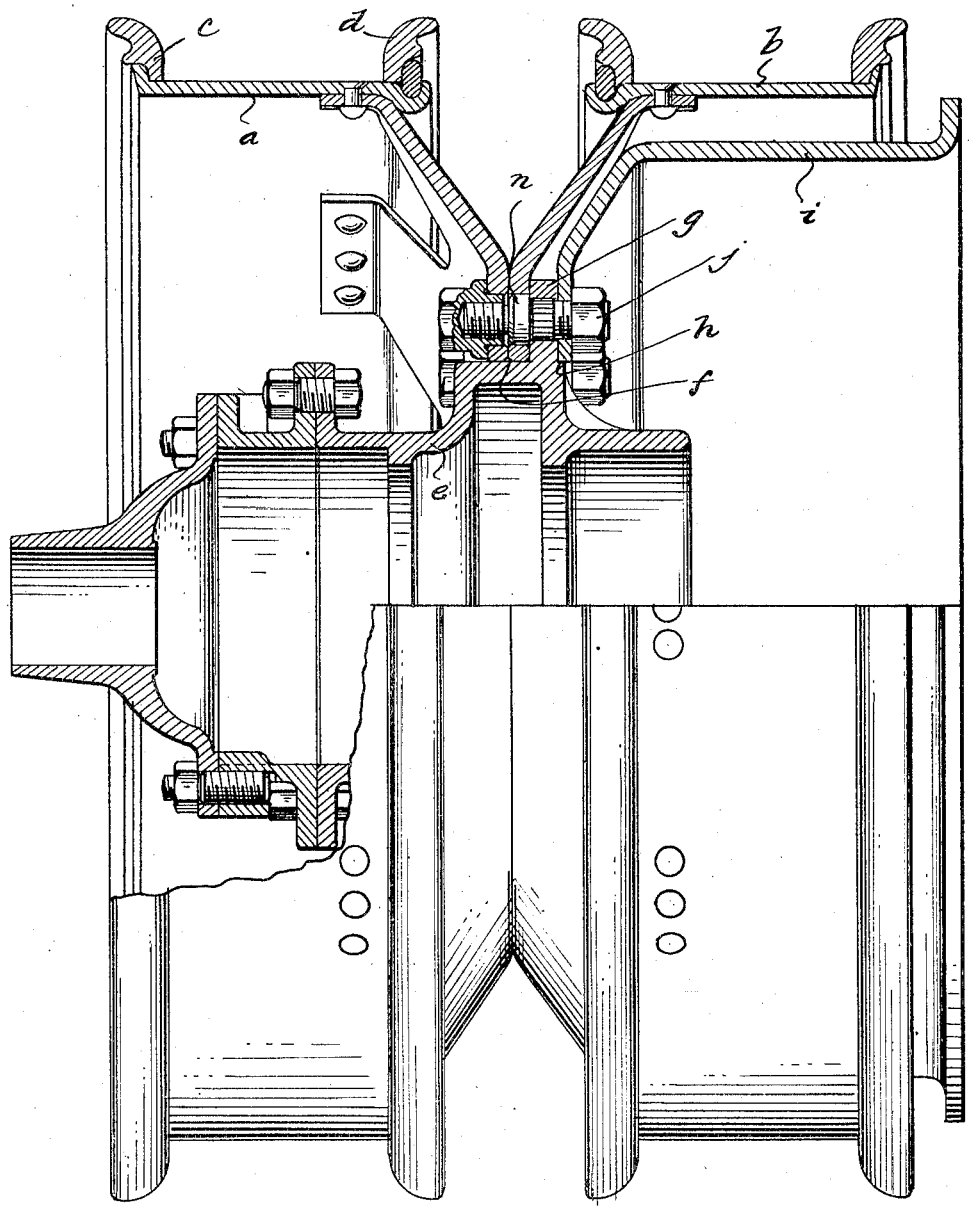

Patented Nov. 29, 1927.

1,650,794

UNITED STATES PATENT OFFICE.

EMIL R. JACOBI AND FRANK H. LE JEUNE, OF JACKSON, MICHIGAN, ASSIGNORS, BY MESNE ASSIGNMENTS, TO KELSEY-HAYES WHEEL CORPORATION, OF DETROIT, MICHIGAN, A CORPORATION OF NEW YORK.

WHEEL.

Application filed June 1, 1926. Serial No. 113,065.

This invention relates to wheels and has for its object a heavy duty wheel, more particularly a so-called dual wheel for trucks.

Dual wheels, of course, have been the subject of numerous patents and are today quite extensively used on heavy buses and trucks. Most of these dual wheels are cast iron wheels or tubular or solid spokes, or else they are heavy metal discs. The solid cast or sheet metal discs are open to the serious objection that they have no ventilation. The brakes on heavy duty vehicles get very hot, often due to mal-adjustment and due to the fact that they are required to dissipate such a large amount of energy in stopping. The proper ventilation and air cooling of these brakes, we believe, has not heretofore been given proper attention. These over-heated brakes, of course, have a very deleterious effect on the brake lining. The heat is communicated thru the heavy mass of metal to the tires and it also is communicated thru the hub to the grease on the axle and melts this and causes it to be thrown out.

It is the purpose of the present invention to overcome these defects as nearly as possible by the proper co-ordination of the brake drum and ventilating features of the wheels; at the same time a further aim is to provide a design of wheel that may be very cheaply made by stamping or forging operations which afford a structure of minimum cost and of considerable strength and low frangibility.

A still further aim is to provide reversible dual wheels which are capable of mounting in place without spacers, and which support the load on the hub at a mid-point between the wheels. Still another factor in the success of our dual wheel is that the wheel web has relatively great yieldability within the small limits that is permissible in structures of this kind. In short, the load of the axle on the wheel is more of a tension load after the fashion of wire spokes than it is a compression load after the fashion of solid cast iron discs or the artillery type of wooden spoke wheel. This is especially advantageous and is permissible without undesirable effects, particularly in a dual wheel as here the load is supported to swing from two points that are somewhat spaced, hence each wheel contributes its share in holding the axle in the proper load plane.

Referring to the drawings:

Fig. 2 is a view, partly in elevation and partly in section of the dual wheels.

Figure 1:
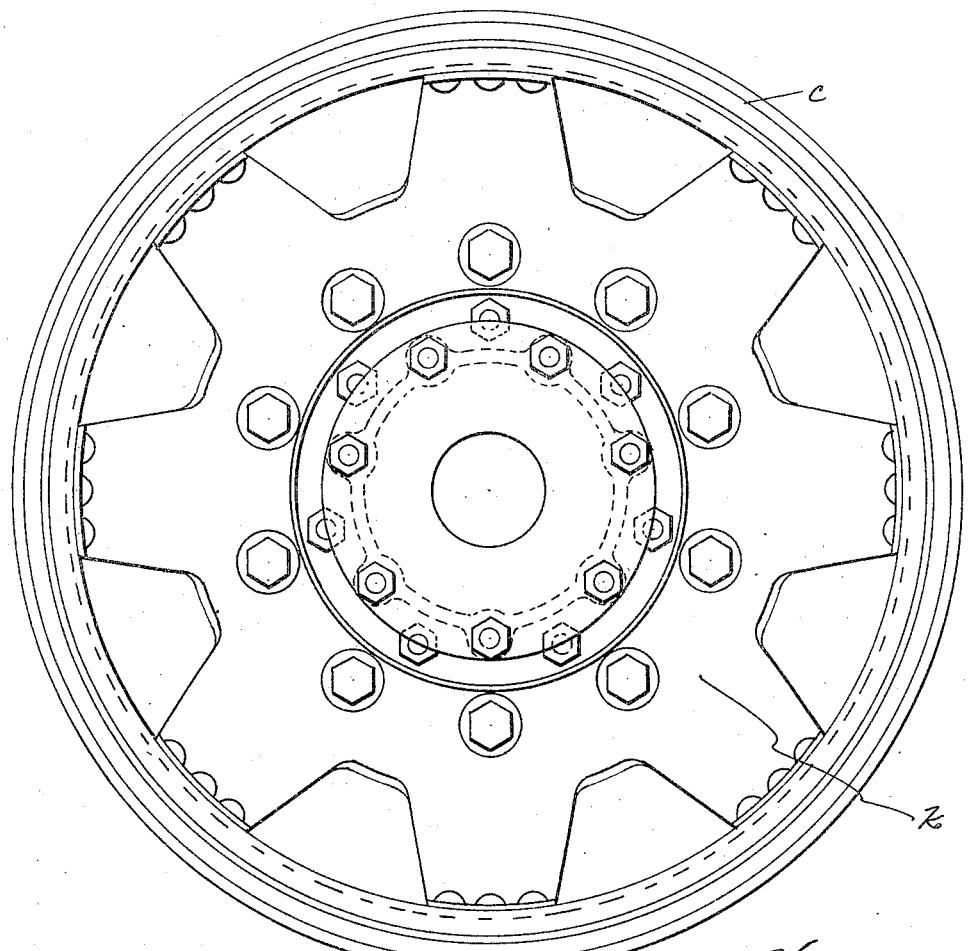
Fig. 1 is a side elevation of one of the wheels.

$a$ and $b$ designate the tire carrying rims which here are preferably shown as riveted to the wheel hub or center which connects the rim with the hub. These tire carrying rims are provided with the usual tire retaining rings $c$ and $d$ which are a well known construction in the art and need not be here further described. The hub comprises a heavy casting or forging $e$ provided with a wheel-center-seat $f$ and an annular flange $g$. This hub member is also provided with a slight offset $h$ which forms a brake-drum-seat. Preferably a large brake-drum $i$ is arranged to be bolted to this seat by means of the bolts $j$ which pass thru the flange $g$ and which serve the further purpose of securing devices for holding the wheels in place.

The wheel webs are made up of reversible deeply dished stampings or forgings designated $k$ which divide into a plurality of ribbon-like connectors between hub and rim, which, however, we hesitate to call spokes for we do not want them to be confused with the ordinary rigid solid compressive-load carrying members that perform this function. These members, it is true, do function in a measure as compression members, but we believe they are more analogous to such tension members as wire spokes, but, of course, have infinitely more strength, durability and freedom from the difficulties and annoyances that attend the wire spoke wheels. These members partake of this tension character by reason of their very decidedly dished construction. This converts them from strictly compression members to largely tension members and gives the wheel much easier riding properties than is ordinarily present in the compression type of connector. At the same time this dished arrangement gives the necessary offset so that the two reversed wheels may be carried on the single narrow seat which is just midway between the load planes of the wheels, and this occurs without the need of a special spacing ring.

What we regard as one of the great advantages of this wheel is its adaptability for cheap and rapid manufacturing methods resulting in a high-grade product. In the copending application, Serial No. 113,064, filed the 1st day of June, 1926, the process by which this wheel is either stamped or forged out of stripped stock is described. It is not necessary here to detail this, for obviously the wheel center also might be stamped out of a disc of metal or made in other ways.

It will be noted that the stock gradually decreases from the center toward the circumference, giving it greater strength where the load carrying area is more restricted and thereby making for uniformity of yieldability throughout the structure, and thereby eliminating the concentration of the flexure at given points that may cause crystallization and fracture of the metal.

What we consider is a particularly effective point of this design of wheel is that it combines yieldability with an adaptability to keep the tires and the wheel structure free from undue amount of heat. This is accomplished by reason of the spaces that intervene between the ribbon connectors allowing access of the air to the brake drum. The brake drum is purposely made large in our preferred construction so as to extend above this space in order that the drum may come in direct contact with the air. Furthermore, these ribbon connectors are much poorer conductors of heat than solid spokes or a continuous disc wheel center. They, therefore, are not so calculated to heat up the rim and the tire if the brake drum does become hot, as is the case in most wheel constructions. These and other features are what we believe to be great advance in heavy duty wheel construction.

Figure 3:
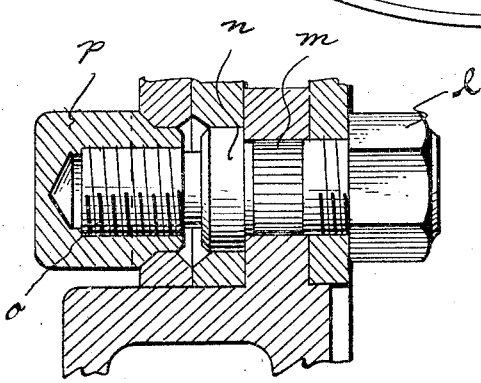
Fig. 3 is a section thru the retaining nut and bolt.

A single set of bolts $j$ hold both the brake drum and the two wheel centers to the hub. These bolts are of special construction, as specifically shown in Fig. 3. They comprise a head $l$, a milled or knurled portion $m$ which can be driven into the annular flange $g$ to hold the bolts in position. They are provided with smooth centering collars $n$ and the usual threaded portion $o$ which receives a tapered cap nut $p$ for holding them in place.

We have already called attention to the resilient cushion action between the rim and hub due to the character of the ribbon connectors. A further function of these connectors is to act as noise dampeners in absorbing the drumming sounds and preventing their being carried out to the rim.

What we claim is:

1. In a wheel, the combination of a hub, a pair of rims and a pair of independent and deeply dished and deeply peripherally notched webs having their centers offset from the planes of the opposed sides of the rims and midway therebetween, a hub provided with a seat therefor and a flange against which both the discs can be bolted, said flange also being offset with respect to the rims, a brake drum, and bolts for securing not only the webs to the flange but the brake drum thereto whereby the brake drum lies substantially within one of the rims.

2. In a wheel structure, a hub, a pair of rims, a pair of dished wheel centers fitting over the hub for connecting the rims and hub, said wheel centers consisting each of a disc member having notches cut in its periphery to form ribbon-like spokes the ends of which are turned over and secured to a rim, a flange on the hub to which the wheel centers are secured and which is offset as regards the rims, and a brake drum secured to said flange whereby it lies in close proximity to one wheel center and extending beyond the notches therein, whereby circulation of air through the notches and over the brake drum is permitted to cool the brake drum.

3. A dual vehicle wheel comprising in combination, a hub having a flange, a pair of dished wheel centers, a rim for each wheel center, said wheel centers fitting over the hub and abutting against the flange with the flange and the extreme central parts of the wheel centers being completely offset as regards the rims, a brake drum abutting against the opposite side of the flange, and bolts extending through the wheel centers, flange and brake drum for securing all these members together whereby the brake drum is mounted close to one wheel center and lies substantially within one rim, said bolts having an intermediate head which abuts against the flange and with nuts on the opposite side of the flange for permanently fixing the brake drum to the flange, said wheel centers having openings of sufficient size to fit over the intermediate head on the bolts, and nuts on the other end of the bolts for clamping the wheel centers to the flange which have a reduced portion of a size corresponding to the size of the intermediate heads for projecting into the openings in the wheel center next adjacent thereto.

In testimony whereof we have affixed our signatures.

EMIL R. JACOBI.
FRANK H. LE JEUNE.